April 8, 1969 H. LOGE ET AL 3,436,980
TRANSMISSION FOR SURGICAL OUTFITS OR THE LIKE
Filed April 13, 1967
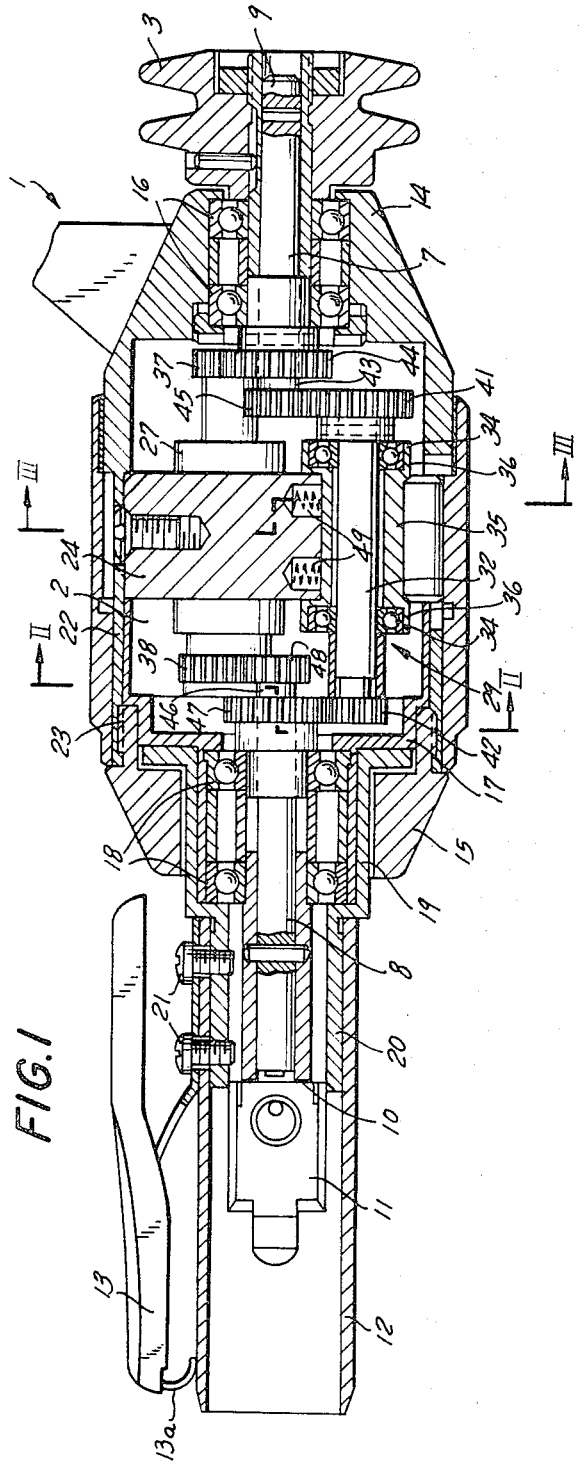
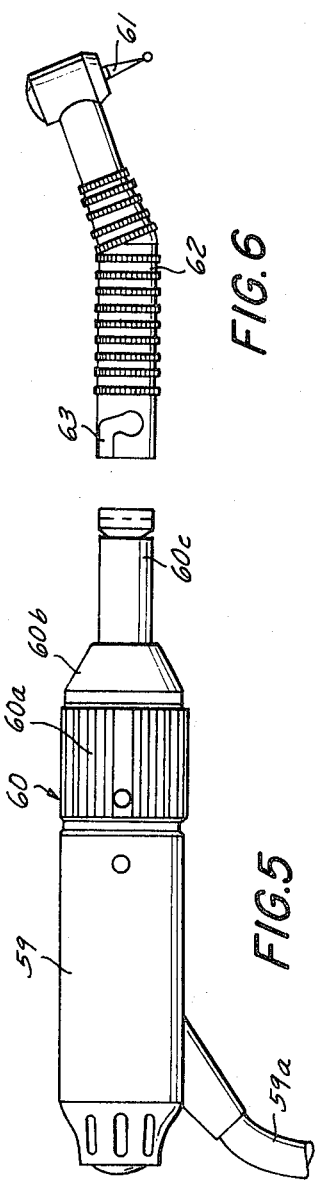
INVENTORS:
Hans Loge
Erich Bareth
BY Michael S. Striker
ATTORNEY

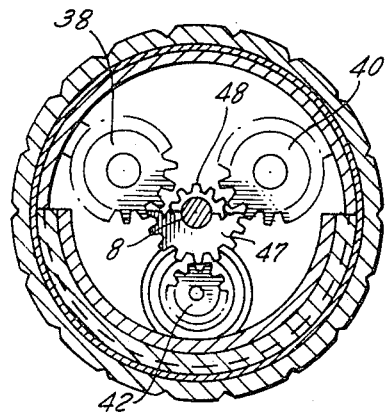
FIG.2
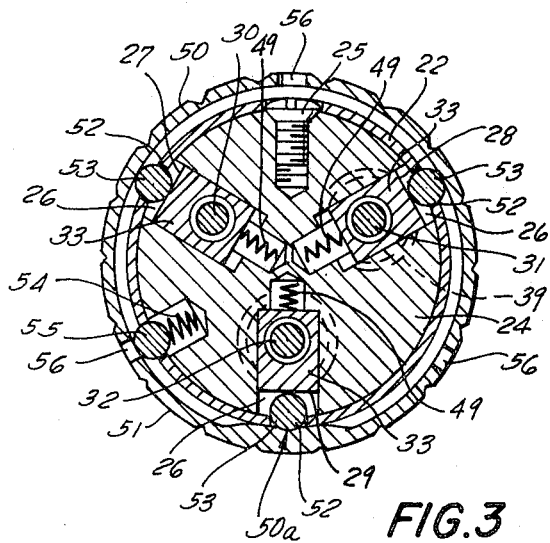
FIG.3
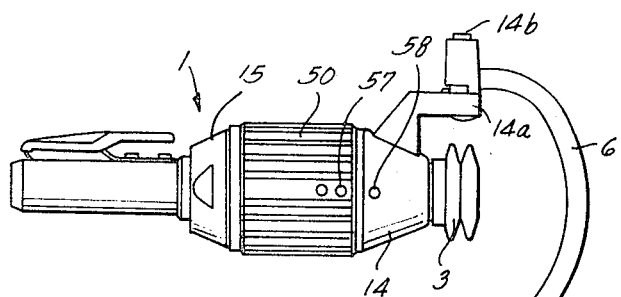
FIG.4
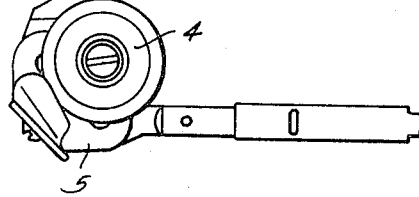

United States Patent Office 3,436,980
Patented Apr. 8, 1969

3,436,980
TRANSMISSION FOR SURGICAL OUTFITS OR THE LIKE
Hans Loge, Biberach, and Erich Bareth, Aunsangweg, Germany, assignors to Kaltenbach & Voigt, Biberach an der Riss, Germany
Filed Apr. 13, 1967, Ser. No. 630,602
Claims priority, application Germany, June 21, 1966, K 59,553
Int. Cl. F16h 3/34
U.S. Cl. 74—352     21 Claims

ABSTRACT OF THE DISCLOSURE

A variable-speed transmission for use in surgical outfits, particularly for transmitting torque to the drill or another tool in a dentist's outfit. Comprises a housing which accommodates coaxial input and output shafts and at least two radially movable motion transmitting units including compound gears whose gears can be moved into mesh with gears on the input and output shafts in response to radial movement with reference to the housing. The speed changer comprises a ring which surrounds the housing and carries an internal projection which can shift one of the compound gears at a time so that the one compound gear then transmits torque from the input shaft to the ouput shaft.

BACKGROUND OF THE INVENTION

The present invention relates to variable-speed transmissions in general, and more particularly to improvements in relatively small transmissions which can be used in portable outfits, especially in dentist's outfits to drive a drill or another surgical or like tool at two or more speeds.

In presently known transmissions for surgical outfits, a series of motion transmitting units are arranged end-to-end and the speed changer means comprises pins or levers which extend outwardly through elongated slots in the transmission housing. The dentist must shift a pin axially in order to change the speed of the output shaft which latter can be coupled to a tool assembly. A serious drawback of such transmissions is that the aforementioned slots permit escape of lubricant from and entry of foreign matter into the interior of the transmission housing. Furthermore, the operator is likely to change the speed at an inopportune time so that he will lose control of the outfit and might injure the patient. For example, the dentist might injure the patient if a pin is unintentionally displaced in a sense to suddenly increase the rotational speed of a drilling tool. At the very best, such unintentional change in speed might interfere with the dentist's work.

Accordingly, it is an important object of the present invention to provide a novel and improved transmission for use in surgical outfits or the like, and to construct and assemble the transmission in such a way that the operator is much less likely to effect a change in speed at a time when such change in speed is undesirable or dangerous.

Another object of the invention is to provide a very compact transmission of the just outlined character whose component parts can be readily incorporated in a very small housing so that the housing can be used as a hand-grip means when the transmission is in actual use.

A further object of the invention is to provide a transmission whose housing need not be provided with exposed slots in order to enable the operator to change the speed ratio and wherein the interior of the housing can be properly sealed against entry of dust, moisture or other undesirable foreign matter.

An additional object of the invention is to provide a transmission with two or more speed ratios wherein the operator can rapidly, conveniently and accurately select the desired speed ratio.

A concomitant object of the invention is to provide a transmission wherein the speed ratio remains unchanged until and unless the operator actually wishes to change the speed of the output member or to bring the output member to a halt.

An ancillary object of the invention is to provide a transmission for tool assemblies of dental outfits or the like and to construct and assemble the transmission in such a way that the length of its housing is but a fraction of the length of the housing in a conventional transmission which is being used in presently known dental or analogous surgical outfits.

An additional object of the invention is to provide a transmission whose input member can be driven by a prime mover which is mounted on the housing of the transmission or by a prime mover which is remote from the housing.

SUMMARY OF THE INVENTION

One feature of our invention resides in the provision of a transmission which may be utilized to drive the tools of dental outfits or the like. In its simplest form, the improved transmission comprises input and output members which are preferably rotatable about a common axis, at least two rotary motion transmitting units movable independently of each other substantially radially of the input and output members between a first position of engagement with such members to thereby drive the output member in response to torque received from the input member and a second position, each motion transmitting unit being arranged to drive the output member at a different speed, and speed changer means movable substantially at right angles to the axes of the input and output members between a plurality of operative positions, one for each unit. The speed changer means comprises displacing means arranged to move one of the motion transmitting units from second to first position in response to movement of the speed changer means to the corresponding operative position.

Each of the motion transmitting units preferably comprises a two-gear idler or compound gear whose gears can be moved into mesh with gears provided on the input and output members. The speed changer means preferably resembles an annulus which is rotatable about a housing accommodating the input and output members and the motion transmitting units. Suitable detent means may be provided to yieldably hold the annulus in a selected operative position. The output member carries a clutch element which can transmit torque to a complementary clutch element provided in the casing of a tool assembly, for example, the casing for a dentist's drill, so that the input shaft can drive the drill through one of the motion transmitting units.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an enlarged axial sectional view of a transmission which embodies one form of our invention and wherein the prime mover is remote from the input member;

FIG. 2 is a transverse section as seen in the direction of arrows from the line II—II of FIG. 1;

FIG. 3 is a transverse section as seen in the direction of arrows from the line III—III of FIG. 1;

FIG. 4 is a smaller-scale side elevational view of the transmission, further showing a support for the transmission housing and a further element of the drive for the input member;

FIG. 5 is a side elevational view of a modified transmission wherein the prime mover is rigid with the transmission housing; and FIG. 6 is a side elevational view of a tool assembly whose casing can be coupled to the housing of the transmission shown in FIG. 5.

DESCRIPTION OF THE PREFERRED EMBODIMENTS

Referring first to FIG. 1, there is shown a portable variable-speed transmission which comprises a housing 1 defining an internal chamber 2 which accommodates certain component parts of the means for transmitting motion from an input shaft 7 to an output shaft 8. The shafts 7, 8 are rotatable about a common axis and are respectively journalled in cupped rear and front sections 14, 15 of the housing 1. The drive for the input shaft 7 comprises a prime mover (not shown) and a power train connecting it with the prime mover. In the illustrated embodiment, the power train includes a sheave 3 which is rigid with the rear end portion 9 of the input shaft 7 and an endless cord, belt or like flexible element (not shown) which is trained around the sheave 3 and around a guide sheave 4 shown in FIG. 4. The rear housing section 14 has an extension 14a which is connected with one end of a bracket or support 6 by means of a pivot 14b enabling the operator to swivel the housing 1 with reference to the bracket 6. The other end of the bracket 6 is articulately connected with a link 5 which carries the guide sheave 4. The housing 1 constitutes a portion of a surgical outfit, particularly of a dentist's instrument, and can be moved with the casing of the tool in any desired direction so that the dentist is in a position to manipulate a boring, grinding, polishing or other rotary tool whose casing is detachably coupled to the front section 15.

Referring again to FIG. 1, the front portion 10 of the output shaft 8 is rigid with a clutch element 11 which can transmit torque to a rotary tool provided in a tool assembly (not shown). Such tool assembly normally comprises a casing or shell which is provided with a coupling element detachable from and connectable with a coupling element (12, 13, 13a) of the housing 1, and a clutch element which can receive torque from the clutch element 11 as soon as the just mentioned casing is properly coupled to the housing 1. The coupling element of the housing 1 includes a tubular portion 12 which can be telescoped into the casing of a tool assembly and a leaf spring 13a which can enter a suitable recess in the casing to establish a readily separable connection with the tool assembly. The spring 13a can be rocked by a manually operable lever 13.

The input shaft 7 is rotatable in two antifriction bearings 16 which are installed in the rear housing section 14. The front housing section 15 accommodates a sleeve-like insert 17 which, in turn, accommodates antifriction bearings 18 for the output shaft 8. The insert 17 serves as a retainer for a sleeve 19 which is rotatable with reference to the housing 1 and is connected with the aforementioned tubular portion 12 by screws 21 or analogous fasteners. These fasteners mesh with the front end portion 20 of the sleeve 19. The purpose of the sleeve 19 is to facilitate movement of the tubular portion 12 to any angular position so that a dentist can turn the casing of a rotary tool to any desired drilling or grinding or polishing position that is best suited for his purpose without having to turn the sections 14 and 15. The parts 12, 13, 13a and 19 are rotatable as a unit about the common axis of the shafts 7, 8.

The rear housing section 14 comprises a forwardly projecting tubular extension or sleeve 22 which is connected with the front section 15 by means of mating threads 23. This sleeve 22 accommodates and fully surrounds a relatively short cylindrical block 24 which is affixed thereto by a radial screw 25. The head of the screw 25 is recessed into the sleeve 22. The block 24 is formed with three preferably equidistant radially inwardly extending channels or ways 26 each of which accommodates one of three motion transmitting units 27, 28, 29. These units are reciprocable radially with reference to the block 24 and serve to transmit torque from the input shaft 7 to the output shaft 8 so that the latter may drive a rotary tool when the casing of a tool assembly is coupled to the housing 1. Each motion transmitting unit is arranged to drive the output shaft 8 at a different speed. As shown in FIGS. 1, 2 and 3, each of the motion transmitting units 27–29 comprises a bearing element 33 whose polygonal median portion 35 is reciprocable in but cannot rotate with reference to the respective ways 26. The flang-like end portions 36 of each bearing element 33 accommodate antifriction bearings 34 for one of three shafts 30, 31, 32 which respectively form part of the motion transmitting units 27, 28, 29. The diameters of the flange-like end portions 36 are such that the bearing elements 33 cannot move axially with reference to the block 24. Pairs of helical expansion springs 49 are received in recesses provided in the innermost regions of the ways 26 to bias the bearing elements 33 radially outwardly, i.e., away from the common axis of the shafts 7, 8. When the springs 49 are free to expand, the respective motion transmitting units 27, 28, 29 are maintained in their outer or second end positions in which they cannot transmit torque from the input shaft 7 to the output shaft 8. The shafts 30, 31, 32 respectively carry pairs of gears (hereinafter called pinions) 37–38, 39–40 and 41–42. The inner end portion 43 of the input shaft 7 carries two coaxial gears 44, 45 and the inner end portion 46 of the output shaft 8 carries two coaxial gears 47, 48. Each of the pinions 37–42 registers with one of the gears 44, 45, 47, 48, as seen in the axial direction of the shafts 7, 8. Thus, and if one of the motion transmitting units 27, 28, 29 is caused to move radially inwardly, i.e., from its second end position to a first end position, one of its pinions will mesh with a gear on the input shaft 7 and its other pinion will mesh with a gear on the output shaft 8. The gears 44, 45 and 47, 48 have different numbers of teeth, and the arrangement is such that only one of the motion transmitting units 27–29 can be moved to its first or operative position, i.e., the other two units are then free to follow the bias of the respective springs 49 and to remain in their second end positions remote from the shafts 7 and 8.

The speed changer means of our transmission is movable at right angles to the common axis of the shafts 7, 8. In the illustrated embodiment, the speed changer means is constituted by an annulus 50 which surrounds the block 24 and is rotatable on the sleeve 22. The external surface of the annulus 50 is preferably knurled or milled, as shown at 51, to facilitate rotation with reference to the housing 1. This annulus 50 comprises a displacing element in the form of a projection or rib 50a extending in parallelism with the axes of the shafts 7, 8 and adapted to move one of the motion transmitting units 27–29 to first end position to thereby establish a driving connection between the shafts 7 and 8. The projection 50a does not move into direct motion transmitting engagement with the median portions 35 of the bearing elements 33. As shown in FIGS. 1 and 3, the transmission comprises three rolling elements 53 each of which is received in one of the ways 26 (radially outwardly of the respective bearing element 33) and extends into an opening or cutout 52 provided in the sleeve 22. When the annulus 50 is moved to one of its three operative positions, the projection 50a engages and depresses the corresponding rolling element 53 so that the latter shifts the adjoining bearing element 33 radially inwardly and places two of the pinions 37–42 into mesh with gears on the shafts 7 and 8.

The rear housing section 14 is provided with a stationary index 58 which is shown in FIG. 4. The annulus 50 has three indices or markers 57 each of which can be moved into registry with the index 58. In this way, the operator knows that the annulus 50 has assumed one of its three operative positions in which one of the motion transmitting units 27–29 transmits torque from the input shaft 7 to the output shaft 8. The three markers 57 are preferably of different size, shape and/or color so that the operator will know which of the three motion transmitting units is operative. This will enable the operator to know the speed at which the tool is driven by the output shaft 8 when the casing of the tool assembly is properly coupled to the housing 1. It is clear that the markers 57 may be replaced by numbers which indicate the three speeds at which the output shaft 8 can be driven by the input shaft 7.

The transmission is further provided with a detent device which prevents unintentional displacement of the annulus 50 from one of its operative positions. As shown in FIG. 3, the detent device comprises a spherical detent element 55 which is received in a radially inwardly extending recess of the block 24 and is biased against the internal surface of the annulus 50 by a prestressed helical spring 54. The annulus 50 is formed with three equidistant recesses or holes 56 one of which receives a portion of the detent element 55 when the annulus assumes the corresponding operative position. Thus, the element 55 will penetrate into one of the recesses 56 only when the projection 50a bears against one of the rolling elements 53 and maintains the corresponding motion transmitting unit 27, 28 or 29 in first end position. The drawings show that the recesses 56 extend through the annulus 50; however, these recesses may take the form of shallow depressions in the internal surface of the annulus 50 so that the chamber 2 is even less likely to accumulate foreign matter and that lubricant remains entrapped in the housing 1.

The transmission of FIGS. 1 to 3 comprises two groups of pinions and gears which are respectively provided with $z_1$ and $z_2$ teeth. The number $z_1$ is greater than $z_2$. The motion transmitting unit 28 serves to drive the output shaft 8 at the speed of the input shaft 7 and the number of teeth on its pinions 39, 40 (shown in FIGS. 3 and 2, respectively) is $z_1$. The pinion 39 can mesh with the smaller gear 45 of the input shaft 7 and the pinion 40 then meshes with the smaller gear 48 of the output shaft 8. The number of teeth on the gear 45 or 48 is $z_2$.

The motion transmitting unit 29 is shown in its first position, i.e., in a position in which its pinions 41, 42 respectively mesh with the gears 45 and 47. The number of teeth on the pinion 41 and gear 47 is $z_1$, and the number of teeth on the pinion 42 and gear 45 is $z_2$. Thus, the unit 29 will drive the output shaft 8 at a speed which is less than the speed of the input shaft 7. When the shaft 8 receives torque from the unit 29, the transmission acts as a step-down transmission.

The third motion transmitting unit 27 can drive the output shaft 8 at a speed which exceeds the speed of the input shaft 7, i.e., the transmission will be of the step-up type when the projection 50a of the annulus 50 is caused to move the unit 27 to its first position. The pinions 37 and 38 respectively comprise $z_2$ and $z_1$ teeth and can be moved into mesh with gears 44 (input shaft 7) and 48 (output shaft 8) which respectively comprise $z_1$ and $z_2$ teeth.

It is clear that the transmission of our invention can comprise only two motion transmitting units or four or more motion transmitting units and that such units need not be equidistant from each other.

FIG. 5 illustrates a modified transmission comprising a housing 60 surrounded by a speed changer 60a. The housing 60 is directly connected with the housing of a small electric motor 59. The housing of the motor 59 constitutes an extension of the housing 60. The numeral 59a denotes a cable which is used to connect the motor 59 to a suitable source of electrical energy. The rotary part of the motor 59 drives the input shaft in the housing 60. The coupling portion 60c of the front housing section 60b can be connected with a complementary coupling portion 63 provided on the casing 62 of a tool assembly having a rotary tool 61. The parts which can rotate the tool 61 include a gear or an analogous clutch element at the free end of the coupling portion 60c, and such gear is connected with the output shaft in the housing 60. In response to connection of the coupling portion 63 with the coupling portion 60c, the just mentioned gear at the free end of the coupling portion 60c will engage a complementary coupling element in the casing 62 so that the complementary coupling element can transmit torque to the tool 61. In the embodiment of FIGS. 5 and 6, the coupling portions 60c, 63 constitute a simple bayonet lock. The tool 61 can be used for drilling of teeth.

An important advantage of our improved transmission is that the length of its housing (1 or 60) is but a fraction of the length of the housing in a conventional transmission for use in surgical outfits or the like. This is due to the fact that two or more motion transmitting units are disposed around the input and output shafts. As mentioned hereinbefore, conventional transmissions comprise motion transmitting units which are disposed end-to-end and wherein one or more outwardly projecting speed changer pins extend through slots provided in the transmission housing. The annulus 50 or 60a need not be provided with any open slots so that escape of lubricant from the internal chamber of the transmission housing is unlikely or plain impossible. Also, the annulus 50 or 60a can seal the internal chamber against entry of dust, moisture or other foreign matter. If the user wishes to arrest the output shaft or the transmission, the annulus 50 or 60a is simply rotated to an intermediate position in which its projection is disengaged from the motion transmitting units.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

We claim:

1. A transmission for driving the tools of dental outfits or the like, comprising input and output members rotatable about a common axis; at least two rotary motion transmitting units movable independently of each other substantially radially of said members between a first position of engagement with said members to thereby drive said output member in response to torque received from said input member and a second position, each of said units being arranged to drive said output member at a different speed; means for permanently biasing said units to second positions; a housing rotatably supporting said members and said units, said housing comprising ways for said units and a block disposed intermediate said members, said ways being provided in said block; and speed changer means constituting an annulus which surrounds said block and is rotatable on said housing about said common axis between a plurality of operative positions, one for each of said units, said annulus comprising displacing means arranged to move one of said units from second to first position in response to movement of said annulus to the respective operative position, said displacing means comprising an internal projection provided on said annulus and arranged to effect movement of one of said units in the respective ways from second to first position in the corresponding operative position of said annulus.

2. A transmission as defined in claim 1, wherein each of said units comprises a pair of coaxial pinions and wherein each of said members comprises gear means, said pinions meshing with said gear means in the first position of the respective unit.

3. A transmission as defined in claim 2, wherein each of said units further comprises a bearing element reciprocably received in the respective ways and a shaft rigid with said pinions and rotatably received in said bearing element.

4. A transmission as defined in claim 1, wherein said housing further comprises a sleeve rigid with said block and disposed intermediate said block and said annulus.

5. A transmission as defined in claim 4, wherein said sleeve has openings registering with said ways and further comprising rolling elements provided in said openings and each arranged to penetrate into the respective ways in response to engagement with said projection to thereby displace the corresponding unit from second to first position.

6. A transmission as defined in claim 5 wherein said projection is constituted by a rib extending in parallelism with said common axis.

7. A transmission for driving the tools of dental outfits or the like, comprising input and output members rotatable about a common axis; at least two rotary motion transmitting units movable independently of each other substantially radially of said members between a first position of engagement with said members to thereby drive said output member in response to torque received from said input member and a second position, each of said units being arranged to drive said output member at a different speed; speed changer means movable substantially at right angles to said common axis between a plurality of operative positions, one for each of said units, said speed changer means comprising displacing means arranged to move one of said units from second to first position in response to movement of said speed changer means to the respective second position; and detent means for yieldably holding said speed changer means in selected operative position.

8. A transmission as defined in claim 7, further comprising a housing for said members and said units, said speed changer means being constituted by an annulus surrounding said housing and rotatable about said common axis, said detent means comprising a detent element radially movably received in said housing and resilient means for biasing said detent element against the internal surface of said annulus, said annulus having a plurality of recesses one of which is arranged to receive a portion of said detent element in an operative position of said annulus.

9. A transmission for driving the tools of dental outfits or the like, comprising input and output members rotatable about a common axis; first clutch means provided on said output member; a tool assembly having a casing and a rotary tool in said casing; complementary clutch means connected with said tool and engageable with said first clutch means; at least two rotary motion transmitting units movable independently of each other substantially radially of said members between a first position of engagement with said members to thereby drive said output member in response to torque received from said input member and a second position, each of said units being arranged to drive said output member at a different speed; and speed changer means movable substantially at right angles to said common axis between a plurality of operative positions, one for each of said units, said speed changer means comprising displacing means arranged to move one of said units from second to first position in response to movement of said speed changer means to the respective operative position.

10. A transmission as defined in claim 9, further comprising a housing for said members and said units, said housing comprising first coupling means and said casing comprising complementary coupling means engageable with said first coupling means to thereby connect said casing to said housing and to establish a driving connection between said clutch means.

11. A transmission as defined in claim 10, wherein said coupling means constitute a bayonet lock.

12. A transmission as defined in claim 1, further comprising a prime mover rigid with said housing and arranged to drive said input member.

13. A transmission as defined in claim 12, wherein said housing constitutes the handgrip portion of a dental outfit.

14. A transmission as defined in claim 1, wherein each of said units comprises a compound gear having two coaxial pinions and each of said members comprises at least one gear, the pinions of that unit which has been moved to first position being in mesh with the gears of said members.

15. A transmission as defined in claim 14, comprising three equidistant motion transmitting units, each of said members comprising two coaxial gears having different numbers of teeth.

16. A transmission as defined in claim 15, wherein said motion transmitting units are arranged to move radially toward said common axis during travel from second to first positions.

17. A transmission as defined in claim 16, wherein each of said members comprises a first gear having $z_1$ teeth and a second gear having $z_2$ teeth.

18. A transmission as defined in claim 17, wherein $z_1$ and $z_2$ are whole numbers and $z_1$ is greater than $z_2$.

19. A transmission as defined in claim 18, wherein the pinions of one of said units comprise $z_1$ teeth and mesh with the second gears of said members when said one unit assumes its first position so that the output member is driven at the speed of said input member.

20. A transmission as defined in claim 18, wherein the first and second pinions of one of said units respectively comprise $z_1$ and $z_2$ teeth, said first pinion meshing with the second gear of said input member and said second pinion meshing with the first gear of said output member when said one unit assumes said first position so that the output member is driven at a speed which is less than the speed of said input member.

21. A transmission as defined in claim 18, wherein the first and second pinions one of said motion transmitting units respectively comprise $z_2$ and $z_1$ teeth, said first pinion meshing with the first gear of said input member and said second pinion meshing with the second gear of said output member when said one unit assumes its first position whereby the output member is driven at a speed which exceeds the speed of said input member.

References Cited

UNITED STATES PATENTS

| 628,184 | 7/1899 | Plass | 74—352 |
|---|---|---|---|
| 659,390 | 10/1900 | Fischer | 74—352 |
| 3,200,663 | 8/1965 | Leonard | 74—353 |

FOREIGN PATENTS

| 209,899 | 3/1940 | Switzerland. |

ARTHUR T. McKEON, *Primary Examiner.*

U.S. Cl. X.R.

74—329, 331